United States Patent

[11] 3,634,782

[72] Inventor Joseph Marshall
Trenton, N.J.
[21] Appl. No. 862,661
[22] Filed Oct. 1, 1969
[45] Patented Jan. 11, 1972
[73] Assignee Thomas & Betts Corporation
Princeton, N.J.

[54] COAXIAL FLAT CABLE
4 Claims, 3 Drawing Figs.

[52] U.S. Cl. .......... 333/1,
333/12, 333/84 R, 333/96, 174/36, 174/117 F
[51] Int. Cl. .......... H01p 5/00,
H04b 3/32, H01b 11/08
[50] Field of Search .......... 333/1, 12,
96, 84; 174/35–36, 113, 117, 117 F

[56] References Cited
UNITED STATES PATENTS

| | | | |
|---|---|---|---|
| 2,585,054 | 2/1952 | Stachura | 174/36 |
| 3,002,047 | 9/1961 | Mannella | 174/35 X |
| 3,179,904 | 4/1965 | Paulsen | 333/1 |
| 3,324,417 | 6/1967 | Garner | 333/96 X |
| 3,364,305 | 1/1968 | Hanlon et al. | 174/113 X |
| 3,416,102 | 12/1968 | Hamlin | 333/96 X |
| 3,439,111 | 4/1969 | Miracle et al. | 174/36 X |
| 3,459,879 | 8/1969 | Gerpheide | 333/1 X |
| 3,469,016 | 9/1969 | Shelton | 174/36 |

*Primary Examiner*—Herman Karl Saalbach
*Assistant Examiner*—Marvin Nussbaum
*Attorney*—Thomas M. Marshall

ABSTRACT: A flat, flexible tape cable is enclosed in a metallic, electrical shield, with the spacing between adjacent signal-carrying conductors, and between said conductors and the shield being so related as to minimize crosstalk and attenuation, and maintain substantially constant characteristic impedance.

INVENTOR.
JOSEPH MARSHALL

INVENTOR.
JOSEPH MARSHALL

COAXIAL FLAT CABLE

With the advancement of the state of the art in computer technology and other sophisticated electronics systems, it soon becomes apparent that conventional wiring is not suitable to satisfy present needs. As computer operating speeds increase and the rise time of switching pulses becomes faster than 1 nanosecond, so evolves the need for more closely controlled impedance, and better shielding to decrease crosstalk between adjacent wires, to eliminate losses due to radiation and interference, and to reduce noise in general. Previously, part of these requirements were met in the low-frequency ranges by different forms of single, round wiring. The art has evolved to include the use of twisted pairs for balanced wiring and twisted triplets for impedance control with additional shielding. Nonetheless, although in some cases these wiring techniques were functionally satisfactory for the low-frequency ranges, they still presented the problems of being excessively bulky, extremely heavy, and expensive. Furthermore, in the higher frequency ranges these wiring techniques proved insufficient both electrically and mechanically.

The second stage in the development of wiring systems for sophisticated electronics was the use of flat, flexible tape cable. The latter is flat, flexible, and lightweight, thereby obviating many of the problems associated with twisted multiple round wire. The problem of crosstalk between adjacent, closely spaced conductors in individual tape cables was solved empirically by merely designating either alternate or every third, fourth, etc., conductor as a signal-carrying conductor while the remaining conductors were connected to ground. To control the crosstalk between layers of cables the plastic dielectric encasement or spacer members between the tape cables provided an adequate separation to place the row of conductors distant enough from each other that their respective EM field did not interfere.

Up to this point we have been discussing frequencies in the tape cable having pulses with rise times not faster thin 1 nanosecond. However, for higher frequencies the signal transmitted through a conductor of conventional flat tape cable is adversely affected by both radiation losses from the conductor and interference effects from the surrounding signals getting into the cable. Accordingly, the state of the art in sophisticated electronics equipment has reached the stage where there is a pressing need for transmission cables capable of efficiently transmitting high-frequency electrical signals while also being capable of maximum flexing. The latter requirement is essentially mechanical in nature and is of primary importance in view of the limited space available for electronic packaging in most sophisticated electronic equipment.

A general object of the invention is an improved flexible, multiple-conductor transmission line for transmitting high-frequency signals.

Another object is to provide a shielded flat flexible cable having minimum crosstalk, minimum radiation and interference, and a characteristic impedance which is substantially constant throughout the length of the cable.

Still another object is a shielded tape cable which is more economical to manufacture than conventional coaxial cable.

Another object is to provide a shielded, flat, flexible tape cable which maintains its flexibility.

Still another object of this invention is to provide a coaxial flat tape cable which includes an electrical shield that may move relative to the tape cable thereby increasing the flexibility of the cable.

Briefly, the present invention accomplishes the above-cited objects by providing a flat flexible tape cable including a plurality of parallel conductors disposed in an insulated body, and the entire length of the cable is enclosed in a suitable shield which completely surrounds the tape cable. The conductors are selected to be either signal-carrying conductors or ground conductors with each conductor having a diameter $d$, and the pitch or distance between signal and ground conductors being designated by the letter $D$. The height or thickness of the flat cable, which corresponds to the separation between the surrounding metallic shield is designated by the letter $h$. The parameters, $h$, $d$, and $D$ are interrelated so as to provide a flat flexible tape cable capable for use in transmitting high-frequency signals with a minimum of crosstalk and attenuation, and with substantially constant characteristic impedance while at the same time providing shielding against radiation out of the cable and interference into the cable.

The relationship between the dimensions, $d$, $D$, and $h$ is expressed below in an equation for the characteristic impedance of a given cable:

$$Z_o \text{ Air} = [42 \cos h^{-1} (1.8x^2 - \sqrt{1.25x^2 - 1})] \cdot [\tan h (1.95h/\pi D)]$$

where:

$x = D/d$ $Z_o$ Air = characteristic impedance of the flat conductor cable without the shield $Z_o \text{ Cable} = Z_o \text{ Air}/\sqrt{\epsilon_r}$ in which:

$\epsilon_r$ = relative dielectric constant of the cable insulation

Further objects and advantages of the invention will become apparent as the following description proceeds and features and novelties which characterize the invention will be pointed out in particularity in the claims annexed to and forming a part of this specification.

For a better understanding of the invention, reference may be had to the accompanying drawings in which.

Figure 1:
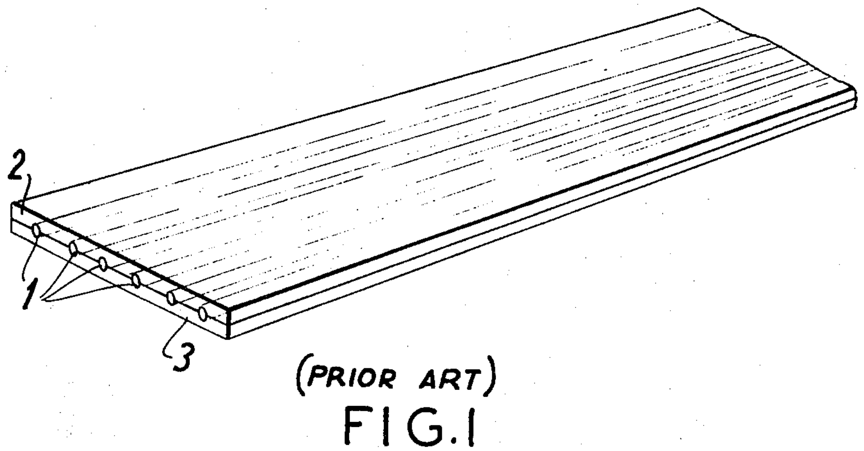
(PRIOR ART) FIG. 1
FIG. 1 is a perspective view of a tape cable disclosed in the prior art.

Turning to FIG. 1, a conventional flat cable of the laminated or extruded type is shown as including either flat or round wires 1 laminated between thin layers of dielectric material 2, 3. The conductors are shown uniformly spaced and parallel to each other, however the center-to-center spacing between conductors may be varied. As described, the flat flexible cable of FIG. 1 is capable of transmitting a plurality of signals. However, as the frequency of the signal increases whereby the rise time of the pulses becomes faster than 1 nanosecond, the crosstalk problem becomes significant. Furthermore, a signal transmitted along a conductor will tend to radiate energy out of the unbounded sides of the cable, and outside electrical radiation may be radiated into the internal structure of the tape cable thereby electrically interfering with the signals transmitted by the conductors. Accordingly, as a transmission line for high-frequency operations, the conventional flat flexible cable has inherent frequency limitations.

Figure 2:
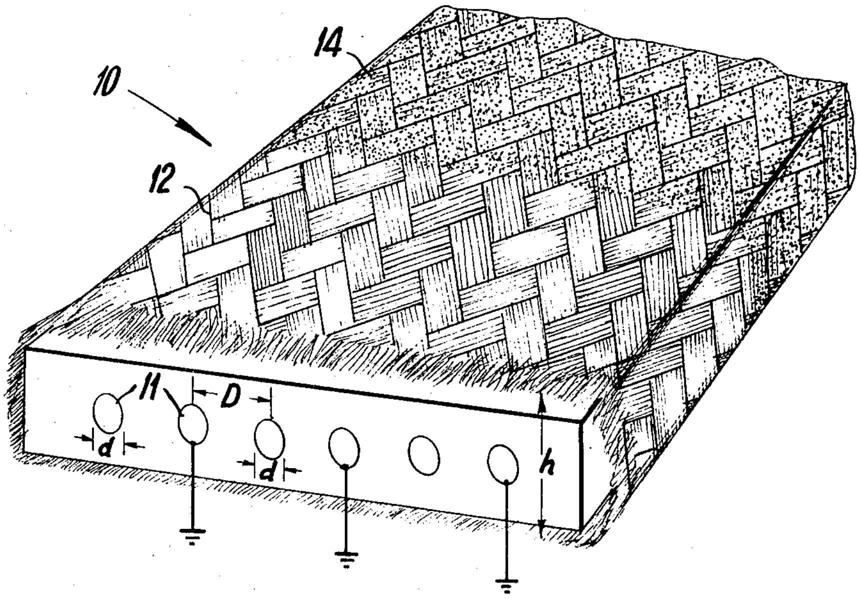
FIG. 2 is a perspective view of a flexible, shielded flat conductor transmission cable employing the principles of the present invention.

In FIG. 2 there is shown an arrangement embodying the principles of the present invention. Shielded flat flexible cable 10 for the transmission of high-frequency signals includes a plurality of conductors 11, each being of a diameter $d$. Alternatively, each conductor may be rectangular in which case the dimension of the longer side of the rectangle would be more effective for purposes to establish the characteristic impedance. Completely surrounding and enclosing the cable 10 is a flexible, continuous electrical shield 12 which is shown as a braided shield of stranded wires. The weaving, braiding, or knitting of shield may consist of round or flat wires. Alternatively, the shield may take the form of a continuous, tubular strip of flexible metal having a cross section which conforms with the cross section of the tape cable. The material and the density of coverage of the shield can be designed for the required protection. It is noted that by completely enclosing the cross-sectional area of the tape cable, the shield completely "shields" the tape cable over the entire circumference of cable and will provide protection for the signals transmitted by the conductors.

The shield is not necessarily bonded to the tape cable thereby enhancing the flexibility of the composite structure. On the other hand, the electrical efficiency of the shield is not affected by having the shield being relatively movable with respect to the tape cable.

It is noted that other forms of electrical shield as is known in the art of coaxial cable may also be employed.

The type of shield structure and the jacket selected for different designs may be such that when the cable flexes the shield does not follow the surface of the dielectric extremely tightly. For such cases the $h/D$ dimensions—by the use of the present formula—can be selected to control the shield's effect on the characteristic impedance within a few (1–4) percent only, thus still holding the advantages this invention represents. It is also noted that for such cases we have to bear in mind that the shield's effect on the characteristic impedance of the cable without the shield ($Z_o$ air) is expressed by the second half of the formula, to wit:

$$\ldots\tan h\,(1.95h/\pi D)$$

and we can consider it as the modified impedance value to which the unshielded three wire transmission lines characteristic impedance will decrease by employing the shield.

Functionally, the flexible metal shield 12 greatly reduces radiation losses emanating from the high-frequency carrying conductors of the tape cable, while simultaneously preventing electrical interference from the surrounding medium to adversely affect the high-frequency signals being transmitted by the conductors.

A primary objective of the ground conductors in the flat cable is impedance control. At the same time they will reduce the crosstalk between signal carrying conductors.

As schematically illustrated in FIG. 2, alternate conductors in tape cable 10 are connected to ground and thus one parameter for the characteristic impedance and also signal-to-signal interference control will be established by the distance $D$ between signal and ground conductors. Alternatively, to obtain even greater shielding against crosstalk, the tape cable may be utilized such that there are two ground conductors between each signal wire.

The thickness of height of the flat flexible tape cable, and accordingly the minimum spacing between the periphery of the shield (i.e., in cross section), is indicated in FIG. 2 by the reference character $h$. It has been determined that the dimensions $h$, $d$, and $D$ are interrelated whereby the characteristic impedance for the subject shielded coaxial flat cable ($Z_0$), as shown in FIG. 2, may be determined by the following equation:

$$Z_0=(1/\sqrt{\epsilon_r})[42\cosh^{-1}(1.8x^2-\sqrt{1.25x^2-1})]\cdot[\mathrm{tank}(1.95h/\pi D)]$$

where $Z_0=(Z_0\ \mathrm{air}/\sqrt{\epsilon_r})$ $Z_0$ air = the characteristic impedance of the cable without the shield and is expressed by the relationship $$Z_0\ \mathrm{air}=[42\cosh^{-1}(1.8x^2-\sqrt{1.25x^2-1})]\cdot[\mathrm{tank}(1.95h/\pi D)]$$

and where $x=D/d>1.5$;

$h/D>1$;

$\sqrt{\epsilon_r}$ is the relative dielectric constant of the cable insulation.

As illustrated in FIG. 2, the coaxial tape cable retains its flexibility in that the braided shield is not bonded to the tape cable, and is inherently flexible and may slide or move relative to the flat cable during folding.

Figure 3:
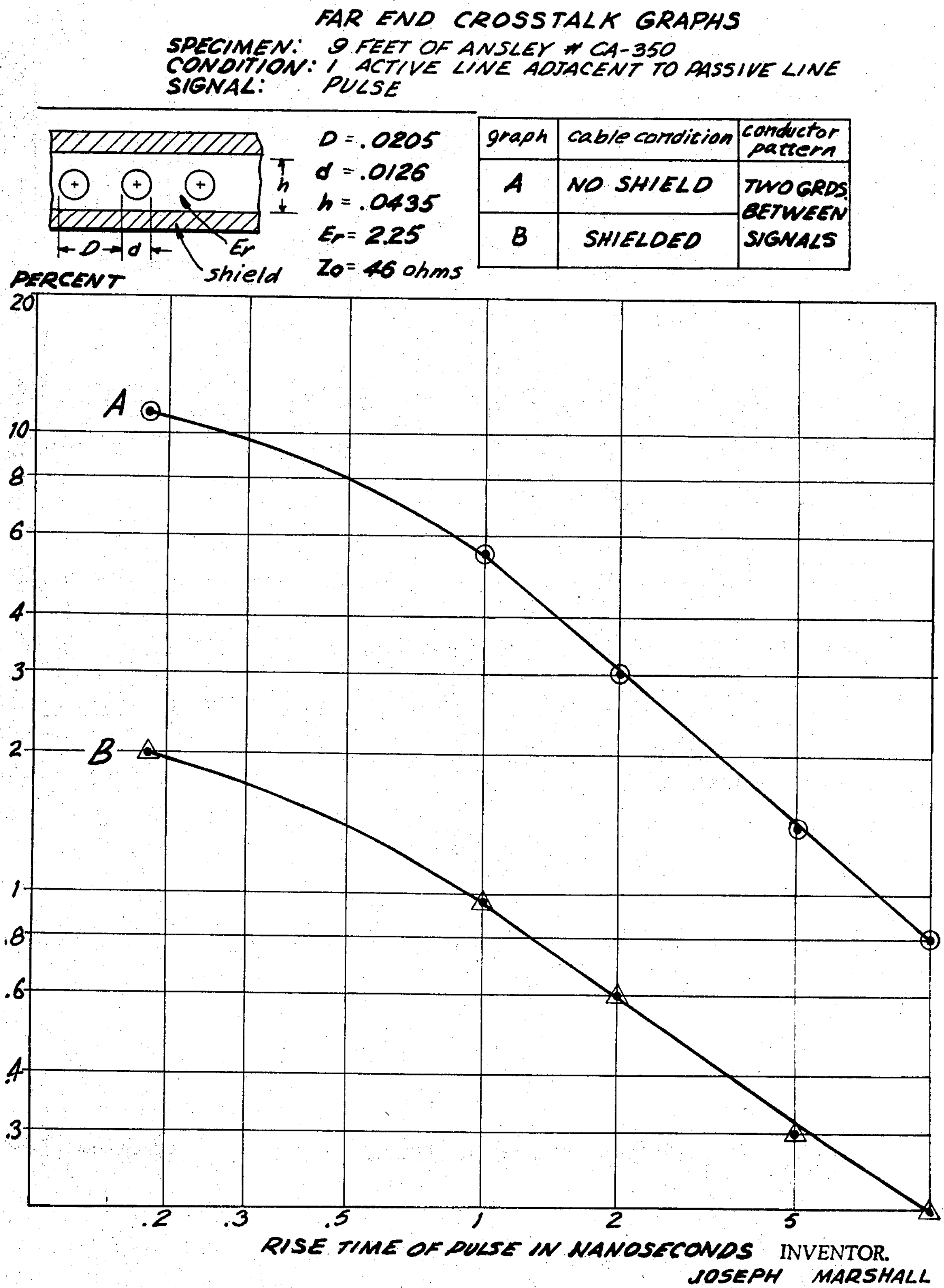
FIG. 3 is a set of curves showing clearly the effect of the shield on signal to signal crosstalk within one cable.

During the transmission of high-frequency signals, the ground conductors located between adjacent signal-carrying conductors (which may be every other or every third, fourth, etc. conductor in the tape cable) are controlling a significant portion of the characteristic impedance. Further control of the characteristic impedance is obtained by the metallic shield 12 which completely surrounds the cross section of the tape cable along the length thereof, and prevents the radiation from, or the radiation into, the signal-carrying conductors. Accordingly, attenuation of the signal is greatly minimized, while at the same time a high-frequency transmission cable is provided. A graphic representation of the effect of the combination of a shield surrounding the entire tape cable, and the grounding of selected conductors is presented in FIG. 3. As illustrated, the percentage of crosstalk is reduced by approximately a factor of 5 when employing the principles of the invention, as contrasted to conventional, unshielded flat cable.

It should also be noted that the effect of the shield between layers of stacked shielded cables would represent even greater isolation of the signals.

If desired, the outer shield may be coated with a suitable nonconducting coating 14, as shown in FIG. 2.

It can readily be appreciated that by utilizing the principles of the present invention a simple flexible shielded flat conductor cable of very high frequency capability is provided.

It will be understood that the above description of the present invention is susceptible to various modifications, changes and adaptations, and the same are intended to be comprehended within the meaning and range of equivalence of the appended claims.

What is claimed is:

1. A flexible, coaxial flat conductor cable for transmitting high-frequency signals comprising an elongated flat conductor cable including a plurality of round conductors embedded in a sheet of dielectric material, and a flexible metallic electrical shield completely surrounding the cross section of said flat conductor cable along the length thereof, and being relatively movable thereto, and wherein selected conductors are connected to ground, while the remaining conductors are used as signal-carrying conductors, in such manner that each said signal-carrying conductor is disposed between at least two conductors connected to ground, and the characteristic impedance of the shielded coaxial flat conductor cable ($Z_0$ cable) is expressed by the relationship:

$$Z_0=(1/\sqrt{\epsilon_r})[42\cosh^{-1}(1.8x^2-\sqrt{1.25x^2-1})]\cdot[\mathrm{tank}(1.95h/\pi D)]$$

where:

$D$ is the distance between signal and ground conductors;

$\sqrt{\epsilon_r}$ is the dielectric constant of the dielectric material;

$d$ is the diameter of the conductors;

$h$ is the distance or separation between the surrounding metallic shield; and $x=D/d$.

2. A flexible, coaxial flat conductor cable as in claim 1 wherein the flexible, metallic electric shield is in the form of a woven braided wire shield.

3. A flexible, coaxial flat conductor cable as in claim 1 wherein the metallic, electrical shield is made of a continuous, tubular strip of flexible metal having a cross section which generally conforms to the cross section of the flat conductor cable.

4. A flexible, coaxial flat conductor cable as in claim 1 wherein the flexible, metallic electrical shield is covered with a nonconductive coating.

* * * * *

UNITED STATES PATENT OFFICE
CERTIFICATE OF CORRECTION

Patent No. 3,634,782 Dated January 11, 1972

Inventor(s) Joseph Marshall

It is certified that error appears in the above-identified patent and that said Letters Patent are hereby corrected as shown below:

Column 1, line 36, "thin" should read -- than --. Column 2, line 10, in the formula "tan *h*" should read -- tanh --. Column 3, line 15, in the equation "tan *h*" should read -- tanh --; line 45, in the equation, "tank" should read -- tanh --; line 51, in the equation, "tank" should read -- tanh --. Column 4, line 43, in the equation, "tank" should read -- tanh --.

Signed and sealed this 31st day of October 1972.

(SEAL)
Attest:

EDWARD M.FLETCHER,JR.
Attesting Officer

ROBERT GOTTSCHALK
Commissioner of Patents